United States Patent [19]

Abeille

[11] Patent Number: 5,038,234

[45] Date of Patent: Aug. 6, 1991

[54] TAPE DRIVE DEVICE FOR A MAGNETIC RECORDER

[75] Inventor: Pierre Abeille, Antony, France

[73] Assignee: Schlumberger Industries, Montrouge, France

[21] Appl. No.: 353,428

[22] Filed: May 18, 1989

[30] Foreign Application Priority Data

May 26, 1988 [FR] France ................ 88 06994

[51] Int. Cl.⁵ .................................. C11B 5/53
[52] U.S. Cl. ............................ 360/84; 360/71
[58] Field of Search ............... 360/85, 95, 84, 96.1, 360/96.2, 71, 73.01, 73.04; 242/198–201

[56] References Cited

U.S. PATENT DOCUMENTS

| | | |
|---|---|---|
| 3,231,668 | 1/1966 | Nishiwaki et al. |
| 3,423,541 | 1/1969 | Wada |
| 3,612,376 | 10/1971 | Johnson |
| 4,096,533 | 6/1978 | Jenkins |
| 4,437,129 | 3/1984 | Yoshida et al. ............ 360/95 |
| 4,573,090 | 2/1986 | Tsuchiya ................. 360/85 |

FOREIGN PATENT DOCUMENTS

| | | |
|---|---|---|
| 3003225 | 9/1980 | Fed. Rep. of Germany |
| 2130346 | 11/1972 | France |
| 2519789 | 7/1983 | France |
| 901620 | 7/1962 | United Kingdom |
| 2004405 | 3/1979 | United Kingdom |

Primary Examiner—David J. Severin
Attorney, Agent, or Firm—Sanford J. Asman

[57] ABSTRACT

A device for driving magnetic tape suitable for running from a pay-out spool to a take-up spool along a determined path during which the tape is wound through a given angle around a stationary element such as a cylindrical drum provided with rotary heads, and is caused to slip over the surface thereof, the device comprising first and second drive elements disposed respectively upstream and downstream from the element, wherein one of the drive elements includes a capstan and wherein the other one of the drive elements includes a wheel having the tape wound thereabout, the wheel being rotated so that its linear speed is greater than the linear speed of the tape and is in the same direction as the linear speed of the tape, and is suitable for enabling the tape to slip over the wheel.

5 Claims, 2 Drawing Sheets

TAPE DRIVE DEVICE FOR A MAGNETIC RECORDER

The present invention relates to a tape drive device for a magnetic recorder, and more particularly for a recorder of the rotary head type, and the invention also relates to a recorder provided with such a device.

BACKGROUND OF THE INVENTION

Such recorders include one or more magnetic read/write heads which are fixed to the periphery of a rotary element which is coaxial with the axis of a cylindrical drum having a magnetic tape wound helically around its surface, with the tape running from a pay-out spool to a take-up spool. Information is recorded on the tape in sloping tracks which slope at an angle which is a function of the ratio between the tape speed and the head speed. There are two families of recorders of this type. In the first family, the heads are fixed to the periphery of a rotating plate which is coaxial with the drum and disposed in a slot provided in an equatorial plane of the drum with the magnetic tape that is wound helically around the drum running over the slot. In the second family, the drum comprises a stationary bottom portion and a rotary top portion having the heads fixed to its base.

The tape is put into place around the drum and is caused to run from the pay-out spool to the take-up spool by sets of wheels and/or spindles disposed respectively upstream and downstream from the drum.

The tape is driven in translation by means of at least one capstan disposed downstream from the drum.

In general, the friction between the tape and a cylindrical body (such as the drum) over which it is slipping increases the tension in the tape downstream from the body. If the tape is wound through an angle "d" around the body (as seen in plan view), if the values of the tension in the tape upstream and downstream from said body are $T_1$ and $T_2$ respectively, and if the coefficient of friction between the tape and the fixed body is "f", so long as:

$$T_2 < T_1 \cdot e^{fd} \quad (1)$$

the tape does not slip, and as soon as $$T_2 = T_1 \cdot e^{fd} \quad (2)$$

then the tape slips over the fixed body. A constant factor is omitted from equations (1) and (2), which factor is a function of the contact area between the tape and the fixed body.

The tension $T_2$ is thus a function of the values of f and d. The value of d is generally fixed and unalterable. In contrast, the value of f may be varied for given conditions of humidity, by increasing the temperature, or the pressure, or the surface roughness of the tape, for example, and it may take values such that the tension $T_2$ becomes excessive, preventing the tape from running properly, and possibly even damaging the physical integrity of the tape.

It is therefore important to be able to determine, or at least to control, the tension in the tape along the length thereof, and in particular downstream from the drum.

Although the tension $T_0$ in the length of the tape at the outlet from the pay-out spool is easily controlled, e.g. by means of a tape tension sensor servo-controlling the rotation of the pay-out spool, the same is not true of the tension $T_2$ in the length of tape downstream from the drum which is determined by a function of $T_0$, f and d, and other parameters, depending on the type of capstan disposed downstream from the drum as provided in prior art devices.

FIG. 1A is a diagrammatic plan view of the path followed by the tape in a recorder provided with a prior art tape drive device. The tape "a" (under tension $T_1$) coming from a pay-out spool which is not shown passes over a first deflector wheel "$b_1$", and then winds round a drum "C" through an angle "δ" with a coefficient of friction "f", then bears against a second deflector wheel "$b_2$" (to given tension $T_2$), and is finally associated with a capstan of the type including a pinch wheel (and comprising a drive wheel "$e_1$" and a pinch wheel "$e_2$" with the tape being pinched therebetween). The tensions $T_1$ and $T_2$ respectively upstream and downstream from the drum satisfy the equation $T_2 = T_1 \cdot e^{f\delta}$. $T_2$ therefore depends directly on the coefficient of friction f, and may become too great if the value of f increases.

FIG. 1B is a diagram similar to FIG. 1A in which the capstan is of the "enveloping" type in which the tape "a" is wound around a drive wheel G through a given angle "δ" and is driven without sliping. The tape has a tension $T_2$ between the drum and the capstan, and a different tension $T_3$ downstream from the capstan. $T_1$, $T_2$, and $T_3$ satisfy the relationships:

$$T_1 \cdot e^{f\delta} = T_2 < T_3 \cdot e^{-f\delta'} \quad (3)$$

When the value of f increases, $T_2$ increases in turn, but only up to a limit value at which the tape starts sliping on the drive wheel. Tape drive is then no longer ensured in satisfactory manner.

In the prior art, attempts have been made to remedy these drawbacks by a device as shown in plan view in FIG. 1C which is provided with two "enveloping" capstans, namely a first or upstream capstan ($b_1$, $H_1$, $b_2$) and a second or downstream capstan ($b_3$, $H_2$, $b_4$), with both capstans rotating at the same speed and both being of the enveloping type. If the values of the tension in the tape upstream and downstream from the first capstan are written $T_0$ and $T_1$ respectively (where $T_0$ is the outlet tension from the pay-out spool), and if the values of the tension in the tape upstream and downstream from the second capstan are written $T_2$ and $T_3$ respectively, with δ' being the angle through which the tape is wound around either of the capstans, and f' being the coefficient of friction between the tape and the respective capstans, then the following relationships hold:

$$T_0 \cdot e^{f\delta} \cdot e^{-f'\delta'} < T_2 < T_3 \cdot e^{f'\delta'} \quad (4)$$

If the value of f increases, then the value of $T_2$ increases until the tape slips on the second (downstream) capstan. The tape is then no longer driven downstream from the drum, but it continues to be driven upstream from the drum by the first (upstream) capstan. Tape then begins to accumulate, thereby releasing the tape from the drum and thus reducing friction. This reduces $T_2$ and thus allows the second capstan to drive the tape again.

Although this prior art two-capstan prior art device provides a kind of automatic regulation of tape travel, it nevertheless suffers from drawbacks.

Because of the inequality in above relationship (4) relating the values of the tensions, the angles, and the coefficients of friction, control of tape running is only relative.

Further, it is necessary for both capstans to rotate at the same speed, and therefore to provide complex and expensive synchronizing means.

Finally, the presence of two capstans complicates the structure of the recorder, takes up a relatively large amount of space, increases the cost of the assembly, and finally is difficult to make compatible with moving tape loading means.

The object of the present invention is to remedy these drawbacks by means of a tape drive device which is simple in design and in operation, and which provides good control of the tension in the tape downstream from the drum.

SUMMARY OF THE INVENTION

To this end, the present invention provides a device for driving magnetic tape suitable for running from a pay-out spool to a take-up spool along a determined path during which the tape is wound through a given angle around a stationary element such as a cylindrical drum provided with rotary heads, and is caused to slip over the surface thereof, the device comprising first and second drive means disposed respectively upstream and downstream from said element, wherein one of said drive means includes a capstan and wherein the other one of said drive means includes a wheel having the tape wound thereabout, said wheel being rotated so that its linear speed is greater than the linear speed of the tape and is in the same direction as the linear speed of the tape, and is suitable for enabling the tape to slip over said wheel.

Thus, the tension $T_2$ in the tape downstream from the drum can be controlled relatively easily. The value of $T_2$ is no longer related to a function $g(T_0, f, d, f', d')$ by an inequality as in the prior art, but by an equality:

$$T_2 = T_0 \cdot e^{(fd - f'd')} \quad (5)$$

and can therefore be determined by a suitable choice for the parameters $f$, $d$, $f'$, $d'$, where $T_0$ can be measured or determined.

In addition, tolerances relating to the speed of rotation of the wheel are very wide, thereby making it possible to use relatively cheap and simple wheel drive means.

Preferably, both the coefficient of friction and the winding angle between the tape and the wheel are substantially equal respectively to the coefficient of friction and the winding angle between the tape and the stationary element.

Determining the tension $T_2$ downstream from the element is made even easier since relationship (5) becomes $T_2 = T_0$ where $T_0$ is the known tension of the length of tape leaving the pay-out spool.

Advantageously, in order to simplify the device and reduce its size, the drive wheel is coupled to the capstan motor by mechanical transmission means.

Advantageously, the linear speed of the drive wheel is about twice the linear speed of the tape, thereby obtaining equal slip speeds both between the tape and the stationary element (the drum), and between the tape and the drive wheel.

BRIEF DESCRIPTION OF THE DRAWINGS

An embodiment of the invention is described by way of example with reference to the accompanying drawings, in which.

DETAILED DESCRIPTION

Figure 1A:
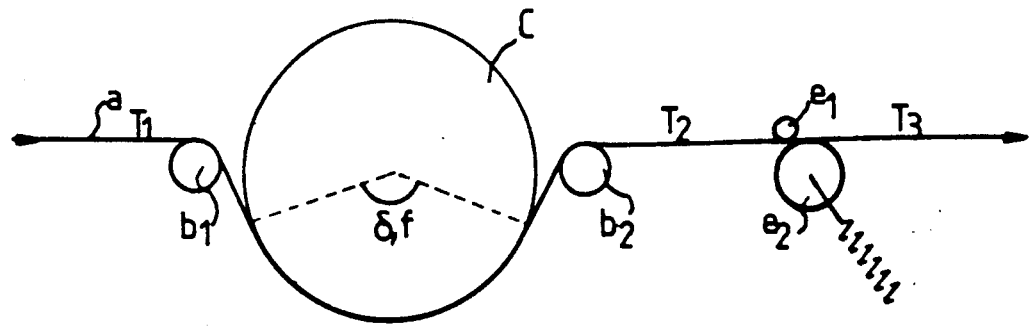
FIGS. 1A, 1B, and 1C are diagrams of prior art devices in plan view.
Figure 1B:
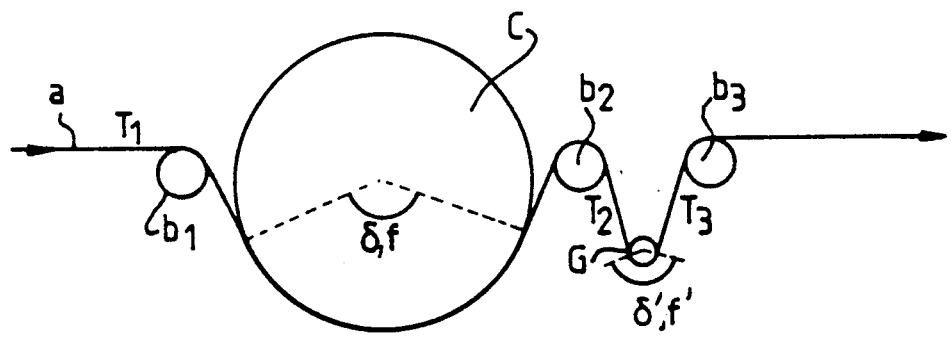
Figure 1C:
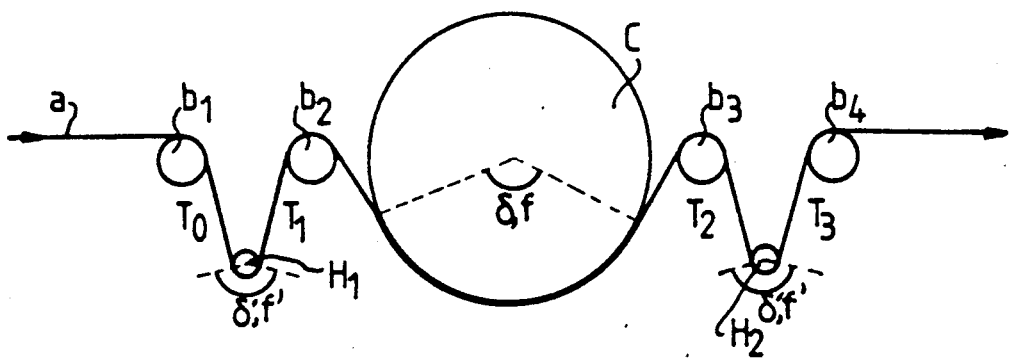

The device of the present invention is described below with reference to a conventional recorder/reader apparatus having rotary magnetic heads, with one embodiment being shown diagrammatically in FIG. 2.

The recorder/reader comprises a cylindrical drum 1 constituted by an upper drum 2 and a lower drum 3 which are separated by a slot 4 lying in an equatorial plane perpendicular to the axis of the drum and substantially halfway up the drum.

A disk-shaped element is provided in the slot suitable for being rotated about the axis of the drum. The disk carries at least one, and generally several magnetic heads 6 disposed regularly around its periphery and projecting very slightly proud of the surface defining the wall of the drum.

The invention is naturally just as applicable to a recorder having rotating heads in which the upper portion of the drum rotates and carries the heads at its base, and indeed the invention is also applicable to a recorder having stationary linear heads, in which case said stationary element is then constituted by a support in which the heads are disposed above one another.

A magnetic tape 7 is suitable for being wound helically around the drum 1 in order to form an omega shape when seen from above. A set of wheels 8A, 8B, 9A, 9B, 9C, and 9D guide the tape 7 and keep it in this configuration while it is running from a pay-out spool 10 towards a take-up spool 11 (which are known per se) in a cassette K. Information is recorded and/or read on the tape in parallel track segments which slope relative to the axis of the tape.

Figure 2:
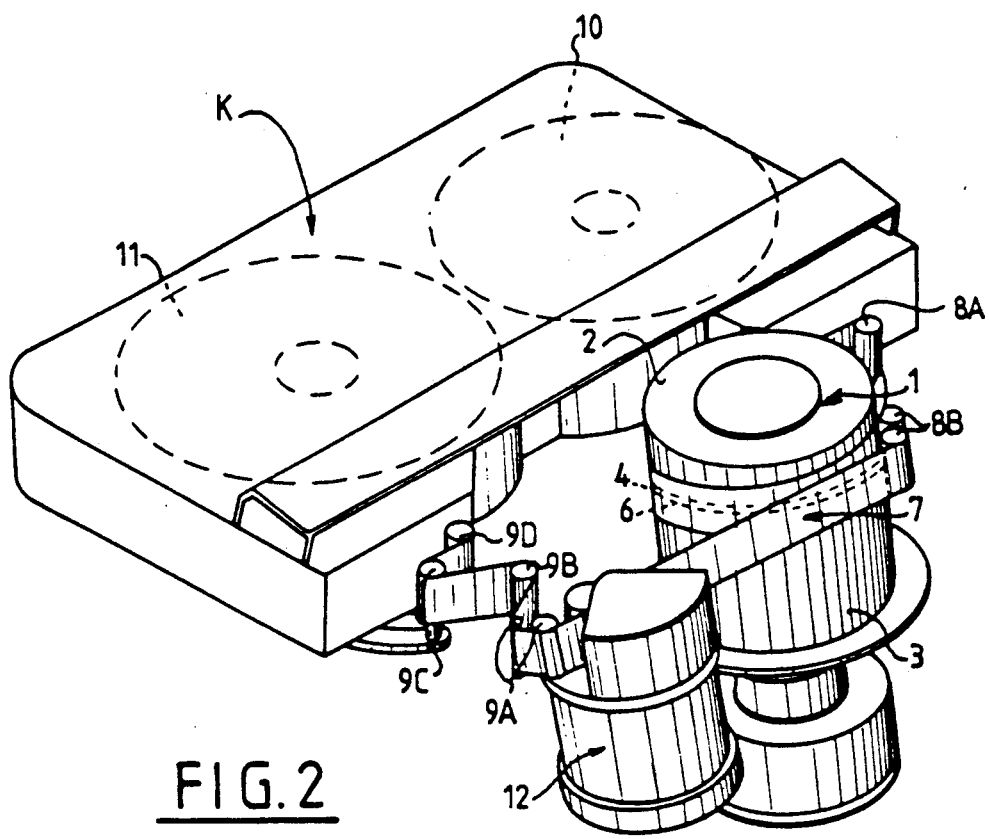
FIG. 2 is a perspective view of a prior art recorder and of an associated cassette suitable for having the device of the invention incorporated therein.

The tape runs along the path shown in FIG. 2 under the action of drive means constituted in the present case by a conventional capstan 12, e.g. of the type provided with a pinch wheel and with a wheel which is rotated by a motor, with the tape being pinched therebetween.

The recorder may also include tape loading means for moving the tape from a position in which it is completely inside the cassette K into an operating position in which the tape follows a path as shown in FIG. 2. Said loading means include means for displacing the wheels 8A, 8B, and 9A to 9D.

In operation, the tape 7 is wound over the surface of the drum through a given angle d.

For reasons of clarity and simplification, the recorder shown in FIG. 2 has only one capstan.

Figure 3:
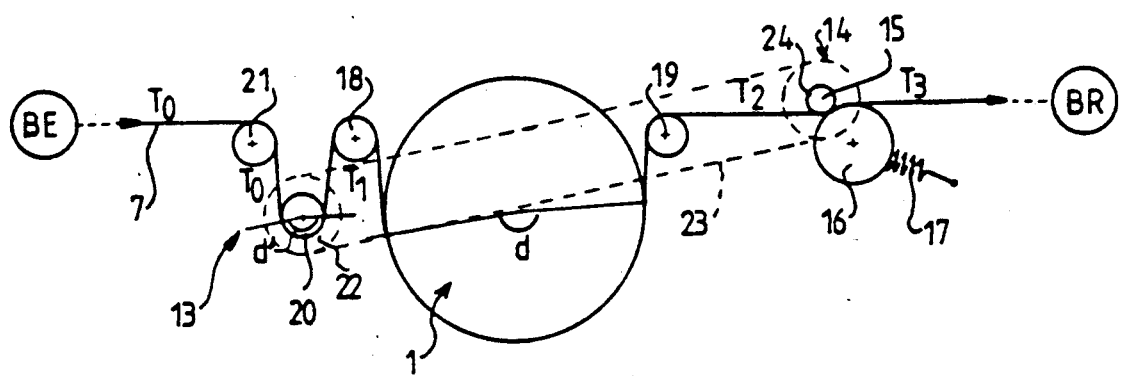
FIG. 3 is a diagram of a device in accordance with the invention in plan view.

The device of the invention, as described below with reference to FIG. 3, is applicable to recorders of the type described above and is provided with first and second drive means respectively disposed upstream and downstream from the drum.

A tape 7 runs from a pay-out spool BE to a take-up spool BR along a path comprising, in succession going from the upstream end to the downstream end: a first drive assembly 13; a drum 1 provided with one or more rotary heads; and a second drive assembly 14. The arrows marked on the tape 7 show the direction in which the tape runs.

The second (or downstream) drive assembly 14 is constituted by a conventional pinch wheel type of capstan comprising a drive wheel 15 and a pinch wheel 16 between which the tape is pinched. The pinch wheel is associated with a thrust member such as a spring 17. The tape is driven without sliping.

In conventional manner, the tape is wound helically around the drum 1 through a winding angle d between an upstream running wheel 18 and a downstream running wheel 19. The tape slides on the drum 1 with a coefficient of friction f.

According to the invention, the first (or upstream) drive assembly 13 comprises a driven wheel 20 with the tape 7 being wound through an angle d' thereabout, and a deflector wheel 21 disposed upstream from the wheel 20. On leaving the wheel 20, the tape winds round the upstream running wheel 18.

The driven wheel 20 has a speed of rotation such that its linear speed is substantially greater than the linear speed of the tape.

As a result, the tape slips over the driven wheel 20 with a coefficient of friction f'.

The coefficients of friction f and f' are functions of the materials from which the tape, the wheel 20, and the drum 1 are constituted.

The wheel 20 of the upstream drive assembly 13 is preferably driven (via mechanical transmission means) by the same motor as drives the wheel 15 of the downstream drive assembly 14.

To this end, the driven wheel 20 is fixed to a pulley 22 having a belt 23 engaged thereover and also over a pulley 24 fixed to the drive shaft of the capstan wheel 15.

Thus, a single motor suffices for causing the tape to run through both of the separate drive assemblies.

This simple disposition does not affect reliability. Indeed the speed at which the driven wheel 20 rotates does not need to be very accurate.

By way of example, the linear speed of the wheel 20 may be about twice the linear speed of the capstan wheel 15.

The tension in the tape has different values $T_i$ along the path of the tape, i.e. it has the following values in succession: $T_0$ at the outlet from the pay-out spool (equal to the tension upstream from the driven wheel 20); $T_1$ downstream therefrom (equal to the tension upstream from the drum 1); $T_2$ downstream from the drum 1 (equal to the tension upstream from the capstan wheel 15); and finally $T_3$ downstream therefrom.

Given equality (2) and that sliping conditions for the tape in one direction over the driven wheel 20 are equivalent to sliping conditions for the tape over the same wheel but in the opposite direction for the tape while the wheel is stationary, then:

$$T_0 = T_1 \cdot e^{f'd'} \qquad (6)$$

Similarly the tape sliping conditions on the drum can be given as follows:

$$T_2 = T_0 \cdot e^{(f'd' - fd)} \qquad (8)$$

The tension in the tape $T_2$ can be determined by the parameters f, f', d, and d' and the known value of $T_0$.

Usually, the value of the angle d through which the tape is wound around the drum is given and cannot be altered. Similarly, the value of the coefficient of friction f is also unalterable, since it is mainly a function of the materials from which the tape and the drum are made and the surface state of the drum.

If the driven wheel 20 is made of the same material as the drum and has the same surface state, then $f = f'$.

Similarly, if the tape is wound round the driven wheel 20 through the same angle as the angle through which it is wound around the drum, then $d = d'$.

The tension $T_2$ as given by equation (8) then becomes:

$$T_2 = T_0 \qquad (9)$$

And as a result $T_2$ is very easily determined, thereby making it possible to control the tension of the tape downstream from the drum accurately.

The device also works when the tape is running in the opposite direction to that shown in FIG. 3.

In this case, the tape is made to run by the capstan wheel 15, with the driven wheel 20 acting in an auxiliary drive role.

In a variant, the above-described device of the invention may include a downstream drive assembly of the "winding" capstan type (with the tape being wound round the capstan wheel and being driven without sliping).

I claim:

1. A device for driving magnetic tape suitable for running from a pay-out spool to a take-up spool along a determined path during which the tape is wound through a given angle around a stationary element such as a cylindrical drum provided with rotary heads, and is caused to slip over the surface thereof, the device comprising first and second drive means disposed respectively upstream and downstream from said element, wherein one of said drive means includes a capstan and wherein the other one of said drive means includes a wheel having the tape wound thereabout, said wheel being rotated so that its linear speed is greater than the linear speed of the tape and is in the same direction as the linear speed of the tape, and is suitable for enabling the tape to slip over said wheel.

2. A device according to claim 1, wherein both the coefficient of friction and the winding angle between the tape and the wheel are substantially equal respectively to the coefficient of friction and the winding angle between the tape and the stationary element.

3. A device according to claim 1, in which the wheel is coupled to the capstan by mechanical transmission means.

4. A device according to claim 1, in which the capstan comprises a pinch wheel type capstan.

5. A device according to claim 1, in which the linear speed of the wheel is less than four times the linear speed of the tape, and is preferably substantially equal to twice said linear speed of the tape.

* * * * *